United States Patent [19]

Stammen et al.

[11] 3,791,474

[45] Feb. 12, 1974

[54] MOTION SELECTOR DEVICE FOR A LIFT TRUCK

[75] Inventors: Harold A. Stammen, New Bremen; Eugene G. Bruns, Maria Stein, both of Ohio

[73] Assignee: Crown Controls Corporation, New Bremen, Ohio

[22] Filed: Apr. 2, 1971

[21] Appl. No.: 130,654

[52] U.S. Cl. ............ 180/77 H, 180/19, 180/77 HT, 180/99, 74/491, 74/512, 188/167, 267/174
[51] Int. Cl. ............................................ B60k 29/02
[58] Field of Search 180/99, 19 H, 19 R, 65 R, 77 R, 180/77 H, 77 HT, 82; 74/523, 491, 512; 267/170, 174; 188/167

[56] References Cited
UNITED STATES PATENTS

| | | | |
|---|---|---|---|
| 2,942,679 | 6/1960 | Gibson | 180/65 R X |
| 3,419,104 | 12/1968 | Messenger | 180/19 R X |
| 2,788,093 | 4/1957 | Steinberg et al. | 180/19 R X |
| 3,465,841 | 9/1969 | Pulskamp et al. | 180/65 R |
| 2,306,042 | 12/1942 | Custer | 180/65 R X |
| 2,373,028 | 4/1945 | Kennedy | 188/167 X |
| 2,332,228 | 10/1943 | Jackson | 188/167 X |
| 2,822,881 | 2/1958 | Treharne | 180/110 |

OTHER PUBLICATIONS

Powrworker Tugger, Clark Equipment Company Advertizement (Supplied by Applicant)

*Primary Examiner*—David Schonberg
*Assistant Examiner*—John P. Silverstrim
*Attorney, Agent, or Firm*—Biebel, French & Bugg

[57] ABSTRACT

A control device for a lift truck of the type having a drive and brake control mechanism, such as a tiller, spring loaded into either a braking or driving arc includes a support mounted on the truck adjacent the tiller and means mounted on the support for restraining the tiller upon its release from entering one of the arcs and for maintaining the mechanism within the other arc to effect the motion control determined by that other arc. In its non-braking mode, the restraining means prevents the tiller from positioning itself in the braking arc and permits the truck to coast. In its braking mode, it prevents the tiller from positioning itself in the driving arc and causes the truck to stop. The restraining means is sufficiently resilient to be overpowered by physically moving the tiller into the other arc to engage the brake (non-braking mode) or to disengage the brake (braking mode) to thereby stop or start the truck.

15 Claims, 7 Drawing Figures

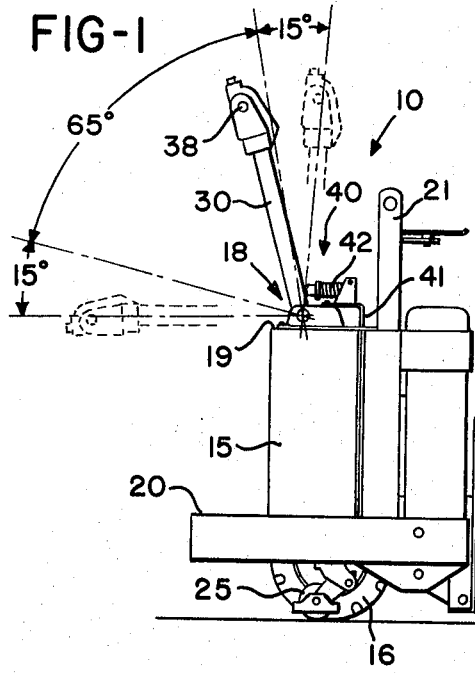
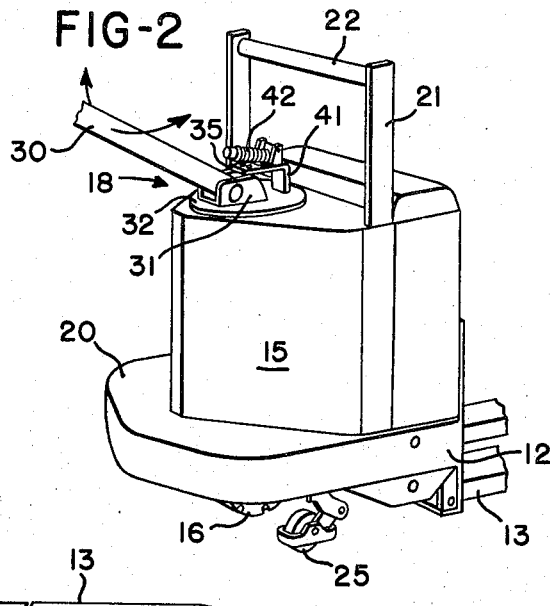
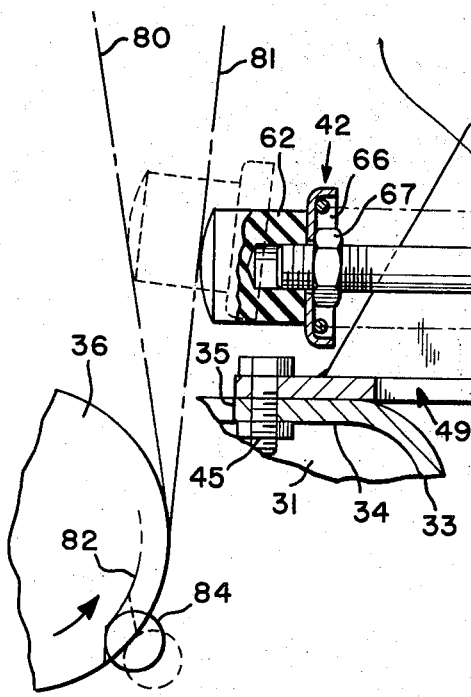
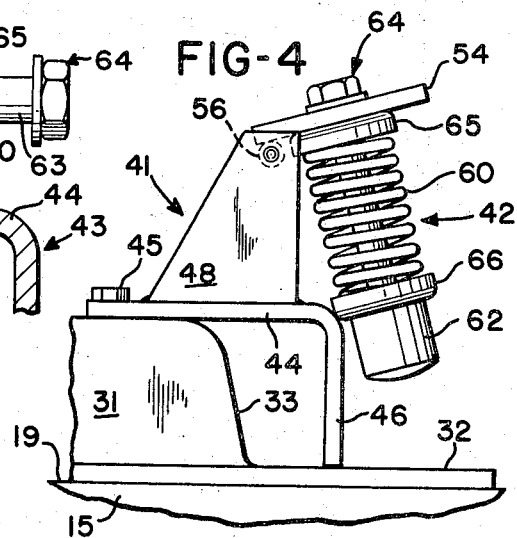
INVENTORS
HAROLD A. STAMMEN
EUGENE G. BRUNS
BY
Marechal, Biebel, French & Bugg
ATTORNEYS

MOTION SELECTOR DEVICE FOR A LIFT TRUCK

BACKGROUND OF THE INVENTION

Most walkie, walkie-rider and similar industrial lift trucks and tow tractors have a deadman type brake wherein, as soon as the tiller or handle is released, the brake is applied. While this type of braking operation provides safety measures and is sufficient for many industrial lift truck applications, it is undesirable in some applications.

For example, in large grocery warehouses, the operator of a truck or tractor must often move down an aisle and select items of stock from assorted stacks. He operates the speed control as he progresses down the aisle, and when he approaches his pick up point, he releases the tiller and leaves the truck. The tiller upon release moves into the stopping arc to immediately stop the truck as the operator moves to obtain a parcel or package.

After placing the item on the truck the operator returns to the control handle and starts movement of the truck toward the next location. Since the truck or tractor stops immediately upon release of the tiller, the operator is obligated to stay with the truck until the desired stopping position is reached. After retrieving the package and returning to the controls, the operator must then move the tiller to disengage the brake before reaccelerating the truck. Since these same time consuming multi-step procedures must be repeated at each subsequent location for each item of merchandise, it is apparent that deadman brake operation whereby the truck does not coast ahead while the operator is busy retrieving packages can be considerably inefficient and result in unnecessary wastages of time.

In the art there are a number of patents which disclose walkie-type lift trucks having tillers spring loaded to actuate a deadman brake at or near a full vertical position. Examples are U.S. Pat. Nos. 2,645,297 of 1953; 2,788,093 of 1957; 2,942,679 of 1960; 3,187,829 of 1965 and 3,465,841 of 1969. However, none of these patents discloses a means for overcoming the inefficient lift truck operation described above in which the truck brakes to stop prior or immediate to the operator leaving the vehicle to retrieve goods.

SUMMARY OF THE INVENTION

The present invention is directed to a motion control device for providing significantly increased flexibility and efficiency in the operation of lift trucks and tractors having tillers or the like spring loaded into a braking arc or a driving arc. In its non-braking mode, the device restrains the tiller from actuating the brake and maintains the tiller in a non-braking condition, allowing the truck to coast until its momentum is lost. In its braking mode, the device restrains the tiller from placement in the driving arc and maintains it in a braking condition.

In general, the device of the present invention includes a support mounted adjacent the base of the tiller and means mounted on the support for engaging the tiller and for preventing the tiller after its release from entering either the braking or the driving arc, depending on the arrangement of the braking and driving arcs.

The restraining means is sufficiently resilient to permit the operator to override the device by forcibly moving the tiller into the arc from which it is being restrained.

In the preferred embodiment, the support is mounted on a swivel cap for relative rotational horizontal movement with the tiller and includes a pivot plate pivotally mounted between a pair of spaced vertical support members secured to the swivel cap. The restraining means is supported by the pivot plate and includes a spring contained between a pair of brackets on a guide pin, and also includes a rubber bumper mounted on the outer end of the guide pin. The inner end of the guide pin is slidably received through an opening in the plate, and the plate is pivotable between an operative position in which the bumper is disposed for engaging the tiller and an inoperative position in which the bumper is incapable of engaging the tiller.

The present invention gives the operator improved operational flexibility. For example, with the device in its non-braking mode and in an operative position, the operator may, after the truck has been directed in the proper direction, release the tiller for coasting movement of the truck and disembark from the truck to garner a series of packages along the path of the truck. If the momentum has not propelled the truck for a sufficient distance, he may accelerate the truck forward again and allow it to coast a farther distance. When the packages are collected, the operator may then mount the truck and at his option move the control device to its inoperative position, after which the truck resumes normal deadman brake operation.

BRIEF DESCRIPTION OF THE DRAWINGS

FIG. 1 is a partly broken-away elevational view of a motion selector device of the present invention mounted on a lift truck at the base of the tiller, the vertical movement of the tiller being shown with its full horizontal and full vertical positions in dotted lines within 15° braking arcs and its restrained position is solid lines within a 65° driving arc; the device being positioned to restrain the tiller from entering the braking arc at full vertical;

FIG. 2 is a partly broken-away perspective view showing the motion selector device in its operative position, and showing the extended operator's platform and the horizontal rotational steering movement of the tiller;

FIG. 3 is a broken-away sectional view of the motion selector device with the restraining position shown in dotted lines and the compressed braking position shown in solid lines, and showing schematically a cam race formed in the tiller and a cam follower therein for controlling the brake in response to movement of the tiller;

FIG. 4 is an elevational view of the motion selector device pivoted to its inoperative position;

DESCRIPTION OF THE PREFERRED EMBODIMENT

Figure 5:
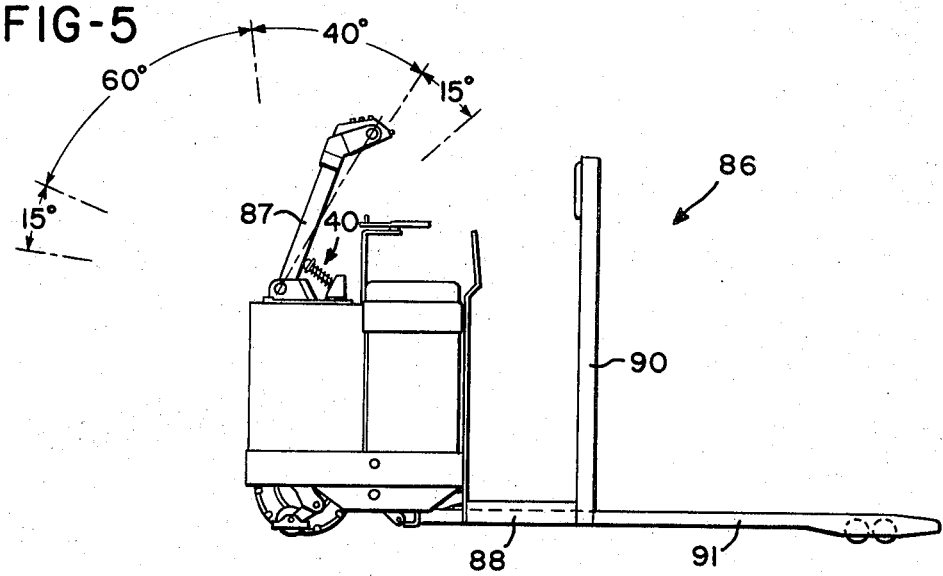
FIG. 5 is an elevational view of a motion selector device mounted on a lift truck with the device in position to restrain the tiller from entering a driving arc.

An industrial lift truck 10 of the rider/walkie type is shown in FIGS. 1–2 and includes a main frame 12 to which is connected a pair of spaced forks 13 extending in a forward direction. Each of the forks 13 may be provided with a wheel or wheels 14, although only one wheel is shown in FIG. 1. A housing 15 is rigidly mounted on the frame 12 and contains a reversible electric propulsion motor, batteries for powering the motor, and a braking system (not shown).

Disposed within the housing 15 is a drive train (not shown) which is rotatable on a vertical axis with respect to the frame 12. The drive train carries a drive wheel 16 (FIG. 1) at its lower end and extends out of the housing 15 at its upper end and terminates in a swivel cap 18 mounted for rotational movement in a horizontal plane just above the top surface 19 of the housing, indicated by the arrows in FIG. 2.

An integral extension of the main frame 12 forms a platform 20 upon which an operator may stand, and a pair of posts 21 mounted on the housing 15 support a lateral safety railing 22 which the operator may grip while standing on the platform 20 and riding the truck 10. Stabilizing castors 25 are mounted on the bottom surface of the frame, one on each side of the drive wheel 16, to prevent the truck from tipping to one side from the weight of the operator. The five described wheels support the lift truck, and the drive wheel 16 provides for steering and traction thereof.

A tiller 30 is mounted on the swivel cap 18 and is adapted to control the drive, steering and braking of the truck. As shown in the drawing, the swivel cap 18 consists of a pair of vertical members 31 disposed to either side of the drive train and an integral swivel plate 32. A vertical bridge plate 33 is provided across the vertical members 31 at one end. Bridge plate 33 continues to a horizontal portion 34 which defines a rearward edge 35. The tiller 30 is secured to a horizontally disposed pivot pin 36 mounted between the vertical members 31 and is movable in the horizontal and vertical directions. Movement of the tiller 30 in the downward direction is limited by the swivel plate 32 while movement thereof in the upward direction is limited by the rearward edge 35 of the bridge plate 33.

The tiller 30 is spring loaded by means (not shown) which normally urge it upwardly toward a vertical deadman brake position. The brake is automatically applied when the tiller 30 moves within a 15° arc at full vertical (dotted lines) or within a 15° arc at full horizontal (dotted lines), but is not applied when the tiller is within a 65° driving arc disposed between the aforesaid 15° arcs.

Rotational movement of the tiller in the horizontal direction (FIG. 2), on the other hand, controls rotation of the drive train on its vertical axis. This controls the drive wheel 16 and steering of the truck. The speed of the motor may be conveniently controlled by using a tiller of the type described in U.S. Pat. No. 3,465,841, assigned to the same assignee as the present invention, in which the control means comprises a rotatable grip 38. This type of control means is particularly useful in trucks of the type described herein, to enable an operator to control them by walking along the side or to the rear thereof or by riding on the platform section 20 and gripping the safety railing 22 with his free hand.

In accordance with the invention, a motion selector device 40 (FIG. 1) includes a support 41 mounted on the swivel cap 18 at the base of the tiller 30 and a device 42 mounted on the support 41 for restraining the tiller upon its release from entering the 15° arc with full vertical. The support 41 includes a pivot connection enabling the restraining means 42 to be pivoted between an inoperative position (FIG. 4) and an operative position (FIG. 3).

In the preferred embodiment, the support 41 includes an L-shaped base plate 43 having a horizontal section 44 secured to the horizontal portion 34 of the bridge plate 33 by bolts 45 and a vertical section 46 which seats on the circular swivel plate 32. A pair of vertical support members 48 extend from the upper surface of the horizontal section 44 and are positioned on either side of an opening 49 formed therein and defining a forward edge or abutment 50. The support 41 also includes a generally rectangular pivot plate 54 for receiving the restraining means. The plate 54 has a fixed end 55 welded to a tube 56 pivotally connected by a pin between the vertical support members 48 and a free end 58 adapted for swinging movement between an operative position within the opening 49 and adjacent the abutment 50 and an inoperative position above the support members 48 (FIG. 4).

The restraining device 42 preferably consists of a compression spring 60 received at its inner end by the pivot plate 54 and having a rubber bumper 62 for engaging the tiller 30 adjacent its outer end. As shown in FIG. 3, the bumper 62 is threadably attached to the outer end of a cylindrical guide pin 63, and the guide pin 63 is slidably received through a circular hole in the pivot plate 54 and has a stop washer and a retention means 64 at its inner end. The spring 60 is confined between a pair of cup-like brackets 65 and 66 having circular holes therein for receiving the guide pin 63, the inner bracket 65 being urged adjacent the pivot plate 54 by the compression of the spring 60 and the outer bracket 66 being retained adjacent the bumper 62 by a nut 67 threaded onto the guide pin 63.

Thus, when the control device 40 is pivoted to its operative position (FIG. 3), the free end 58 of the pivot plate 54 is disposed within the opening 49 and abuts the forward edge 50 of the L-shaped base plate 43. This positions the bumper 62 for engaging the forward surface of the tiller 30 and for neutralizing the deadman brake by restraining the center line of the tiller 30 from entering the 15° braking arc at full vertical, allowing the truck to coast. The operable position is therefore referred to herein as the non-braking mode.

In operation, after the tiller 30 is released by the operator, the control device 40 counteracts the upward bias and maintains the tiller 30 in the position shown in FIG. 1 wherein the center line thereof is within the 65° driving arc. The truck 10 will therefore coast because the motion selector 40 when in its non-braking mode prevents the brake from engaging. After aligning the drive wheel 16 in the proper direction and accelerating the truck by means of the rotatable grip 38, the operator is free to dismount from the truck and to perform a secondary operation, such as preparing to load boxes from a series of stacks along the path of travel of the truck.

After completing the secondary operation, the operator may then mount the truck 10 or accelerate it to permit additional coasting. If he mounts the truck he may either move the control device to its inoperative position (FIG. 4), to render the control device 40 inoperative, or accelerate the truck without disturbing the control device 40, depending upon whether automatic braking is desired. If the selector 40 is left in its operating position, he may manually override it by forcibly moving the tiller 30 into the 15° braking arc with full vertical to stop the truck. The latter operation may be accomplished because the spring 60 is provided with sufficient resilience to be overpowered by the operator. It returns to its restraining position when released.

When the tiller 30 is moved forwardly from its restrained position, wherein the bumper 62 is in the general position shown in dotted lines in FIG. 3, the spring 60 is compressed between the brackets 65 and 66 and the bumper 62 moves to the position shown in solid lines in FIG. 3. The tiller 30 is adapted to actuate the braking system as it is moved from the restrained position (line 80) to the full braking position (line 81).

As shown in FIG. 3, the pivot pin 36 has attached a cam 82 which has a sloped configuration. A cam follower 84 rides on the cam 82 and is operatively connected to the braking system. When the tiller 30 engages the bumper 62, the cam follower 84 is located at the top of the cam 82 (dotted lines) where it deactuates the brake. As the tiller 30 is forcibly moved in the clockwise or forward direction from line 80 toward line 81, the follower 84 enters the cam 82 (solid lines) and actuates the braking system. As soon as the tiller 30 is released, the spring 60 forces it to position 80 and the pivot pin and cam 82 are rotated in the counterclockwise direction, causing the follower 84 to ride over the cam 82 and deactuates the brake to permit the truck 10 to be propelled again.

Referring to FIG. 5, a similar type of rider/walkie truck 86 includes a tiller 87 spring loaded through a 15° braking arc near full horizontal, a 60° driving arc, a 40° braking arc including full vertical, and into a 15° driving arc forward of full vertical. A platform 88 is attached to the forward end of the truck, and a vertical safety partition 90 separates the forks 91 from the platform 88. The truck 86 is operable by an operator walking to the rear of the truck by movement of the tiller 87 in the 15° braking and 60° driving arcs, and/or by an operator standing on the platform 88 by movement of the tiller 87 in the 40° braking arc and the 15° driving arc adjacent full vertical.

In this arrangement, the same motion selector device 40 previously described is positionable to restrain the tiller 87 from entering the 15° driving arc. Thus, when located in its operative position (FIG. 5), referred to herein as its braking mode, the device 40 prevents the tiller upon its release from entering the 15° driving arc and causes the truck to stop. Of course, the device 40 may be pivoted forwardly to an inoperative position for normal operation. It is also sufficiently resilient to be physically overpowered, so that an operator standing on the platform 88 can easily move the tiller 87 into the 15° driving arc when the device 40 is in its operative position.

Figure 6:
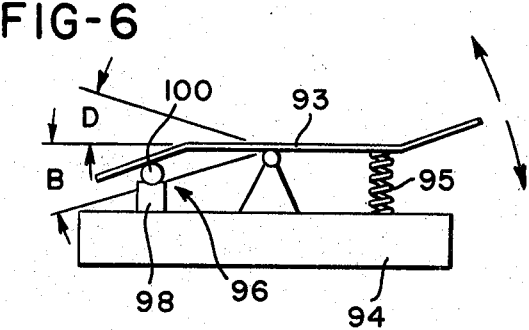
FIG. 6 is a schematic sketch of a motion control device for use on a hand grip drive and brake control mechanism.
Figure 7:
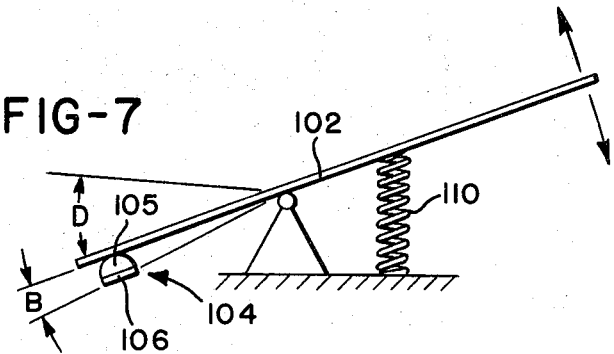
FIG. 7 is a schematic sketch of a motion control device for use on a foot pedal drive and brake control mechanism.

The invention is not intended to be limited to the tiller-type drive and brake control mechanism (FIGS. 1-5), described above, but may also be employed with the hand lever and foot pedal types of drive and brake control mechanisms as well, shown schematically in FIGS. 6-7 respectively.

Referring to FIG. 6, a manually operated lever 93 is pivoted to a hand grip 94, and a spring 95 urges the lever 93 through a driving arc D and into a braking arc B. A restraining device 96 includes a base 98 slidably mounted on the hand grip 94 and a resilient restraining member 100. The device 96 may be moved into an operative position to restrain the lever 93 from entering the braking arc upon its release. In addition, as in the previously described operations, when the member 100 is in its restraining position, it may be manually compressed or overpowered to permit the operator to actuate the brake. The device 96 can be slid in and out of position so that when slidably removed it permits the lever upon its release to enter the braking arc B.

A foot operated pedal 102 (FIG. 7) is pivoted to the truck and operates in a similar manner. The restraining device 104 includes a resilient and compressible portion 105 and a base portion 106 slidably mounted on the truck. The spring 110 urges the pedal into the braking arc B, but when the device 104 is in position, it maintains the pedal 102 in the driving arc D and prevents it from moving into the braking arc B. The device 104 may be overpowered into the arc B by applying pressure with the heel of the foot, and as above, it may be slidably removed to permit the pedal 102 to enter the braking arc B upon its release.

It is thus apparent from the foregoing description and accompanying drawing that a control device constructed in accordance with the present invention provides desirable features and advantages. The control device of the present invention enables the operator to disembark from the truck while the truck is moving without automatically applying the brake. The operator may also propel the truck forward allowing it to coast without having to mount the truck to disengage the brake. This is particularly useful in applications, such as in large grocery warehouses, where a number of different stock items must be selected from a series of locations along a given path.

The advantage of the present invention resides not only in the flexibility of handling the truck, for example, the coasting movement obtained by the momentum of the truck with the restriction of automatic braking, but also in the improved usefulness of garnering items of stock while the truck is coasting to an advanced position. The invention essentially frees the operators hands to perform the more useful function of collecting stock, and he is not required to repeatedly disengage the brake.

These advantages are all accomplished by the novel and relatively simple construction of the present invention. Accordingly, the present invention, from the practical standpoint, provides a much needed advance in the art.

While the forms of apparatus herein described constitute preferred embodiments of the invention, it is to be understood that the invention is not limited to these precise forms of apparatus, and the changes may be made therein without departing from the scope of the invention.

What is claimed is:

1. In a lift truck or tow tractor of the type having a mechanism for controlling the drive and brake of the truck, the truck having a drive motor and a brake for motion control, means mounting the drive and brake control mechanism for movement on the truck, means coupling the brake to movement of the mechanism through at least one predetermined braking arc, means coupling the drive motor to movement of the mechanism through at least one predetermined driving arc, and means normally urging the mechanism upon its release into one of the driving and braking arcs, an improved motion selector device comprising:

support means on the truck adjacent the drive and brake control mechanism, means mounted on said support means for restraining movement of the control mechanism into the one arc by the urging means and for maintaining the mechanism within another arc to effect the motion control determined by the other arc, said restraining means being sufficiently resilient to be overpowered by physically moving the control mechanism within the one arc, and a slide mechanism on said support means for sliding said restraining means between an operative position wherein said restraining means engages and restrains the mechanism and an inoperative position wherein said restraining means does not engage and restrain the mechanism.

2. The truck defined in claim 1 wherein the mechanism is urged into a braking arc, and wherein said restraining means maintains the mechanism within a driving arc permitting the truck to coast after the mechanism has been released.

3. The truck defined in claim 1 wherein the mechanism is urged into a driving arc, and wherein said restraining means is positionable to maintain the mechanism within a braking arc causing the truck to stop after the mechanism has been released.

4. The truck defined in claim 1 wherein said support means is a hand grip, the mechanism is a manually operated lever spaced from and pivoted to said grip, and said restraining means is a resilient member positionable between said grip and said lever.

5. The truck defined in claim 1 wherein said support means is a surface on the truck, the mechanism is a foot operated pedal spaced above and pivoted to said surface, and said restraining means is a resilient member positionable between said pedal and said surface.

6. In a lift truck or tow tractor of the type having a tiller for controlling the drive and brake of the truck, the truck having a drive motor and a brake for motion control, means mounting the tiller for pivotal movement on the truck, means coupling the brake to movement of the tiller through at least one predetermined braking arc, means coupling the drive motor to movement of the tiller through at least one predetermined driving arc, and means normally urging the tiller upon its release into one of the driving and braking arcs, an improved motion selector device comprising:

support means on the truck adjacent the tiller, said support means including at least one restraining means support member attached to the tiller mounting means adjacent the tiller for movement with the tiller, means for restraining movement of the tiller into the one arc by the urging means and for maintaining the tiller within another arc to effect the motion control determined by the other arc, said restraining means being sufficiently resilient to be overpowered by physically moving the tiller within the one arc, means mounted on said restraining means support member for receiving and mounting said restraining means thereon, and a pivot on said receiving means for pivoting said receiving means on said support member between an operative position wherein said restraining means engages and restrains the tiller and an inoperative position wherein said restraining means does not engage and restrain the tiller.

7. The truck defined in claim 6 including abutment means on the truck for locating said receiving means when moved to said operative position.

8. The truck defined in claim 7 including a swivel cap mounted on the truck, said cap including a swivel plate, a pair of vertical tiller support members mounted on said swivel plate, and a bridge plate mounted across said tiller support members, wherein a drive train connects the tiller to the motor and has an upper end which terminates in said cap, wherein the tiller is pivoted to said cap, wherein said restraining means support means includes a base plate secured to said bridge plate, and wherein said abutment means is a forward edge formed in said base plate by an opening therein.

9. In a lift truck or tow tractor of the type having a tiller for controlling the drive and brake of the truck, the truck having a drive motor and a brake for motion control, means mounting the tiller for pivotal movement on the truck, means coupling the brake to movement of the tiller through at least one predetermined braking arc, means coupling the drive motor to movement of the tiller through at least one predetermined driving arc, and means normally urging the tiller upon its release into one of the driving and braking arcs, an improved motion selector device comprising:

support means on the truck adjacent the tiller, said support means including at least one restraining means support member attached to the tiller mounting means adjacent the tiller for movement with the tiller, means for restraining movement of the tiller into the one arc by the urging means and for maintaining the tiller within another arc to effect the motion control determined by the other arc, said restraining means being sufficiently resilient to be overpowered by physically moving the tiller within the one arc, means including a plate mounted on said restraining means support member for receiving and mounting said restraining means thereon for movement between an operative position wherein said restraining means engages and restrains the tiller and an inoperative position wherein said restraining means does not engage and restrain the tiller, and said restraining means including a spring having an inner end and an outer end, bumper means mounted on the outer end of said spring, and means for retaining the inner end of said spring on said plate.

10. The truck defined in claim 9 wherein said restraining means further comprises a guide pin having an inner end and an outer end, inner and outer brackets having means defining openings for receiving said guide pin therethrough, said inner bracket being retained adjacent said plate and said outer bracket being retained adjacent said bumper means, said brackets being formed for containing said spring therein, and means defining an opening in said plate for receiving said guide pin for sliding movement therethrough upon compression of said spring.

11. The truck defined in claim 10 including a cam operatively connected to the tiller, a cam follower operatively connected to the brake and positioned for movement into and out of said cam when the tiller is pivoted into and out of the one arc, and said follower being operative to effect the motion control determined by the one arc as it enters said cam.

12. In a lift truck of the type having a drive motor and a brake for motion control, a tiller for controlling the drive and brake of the truck, means mounting the tiller for pivotal movement on the truck, means coupling the brake to movement of the tiller through a predetermined braking arc, means coupling the drive motor to movement of the tiller through a predetermined driving arc, and means normally urging the tiller upon its release into one of the driving and braking arcs, an improved motion selector device comprising support means including members mounted on the truck adjacent the base of the tiller, and restraining means mounted on said support means, said restraining means including a plate having an opening therein and pivotally mounted across said support members, a guide pin slidably disposed within said opening and having an inner end and an outer end, a bumper attached to the outer end of said pin for engaging the tiller upon its release, retention means attached to the inner end of said pin, an inner bracket mounted on said pin adjacent said plate, an outer bracket mounted on said pin adjacent said bumper, and a spring mounted on said pin and compressibly contained between said brackets and being positionable to restrain movement of the tiller into the one arc and to maintain the tiller within the other arc to effect the motion control determined by the other arc, said spring being sufficiently resilient to be overpowered by physically moving the tiller within the one arc.

13. In a lift truck or tow tractor of the type having a mechanism for controlling the drive and brake of the truck, the truck having a drive motor and a brake for motion control, means mounting the drive and brake control mechanism for movement on the truck, means coupling the brake to movement of the mechanism through at least one predetermined braking arc, means coupling the drive motor to movement of the mechanism through at least one predetermined driving arc, and means normally urging the mechanism upon its release into one of the driving and braking arcs, an improved motion selector device comprising:

support means on the truck adjacent the drive and brake control mechanism, means mounted on said support means for restraining movement of the control mechanism into the one arc by the urging means and for maintaining the mechanism within another arc to effect the motion control determined by the other arc, said restraining means being sufficiently resilient to be overpowered by physically moving the control mechanism within the one arc, and a pivot on said support means for pivoting said restraining means between an operative position wherein said restraining means engages and restrains the mechanism and an inoperative position wherein said restraining means does not engage and restrain the mechanism.

14. The truck defined in claim 13 wherein the mechanism is urged into a braking arc, and wherein said restraining means maintains the mechanism within a driving arc permitting the truck to coast after the mechanism has been released.

15. The truck defined in claim 13 wherein the mechanism is urged into a driving arc, and wherein said restraining means is positionable to maintain the mechanism within a braking arc causing the truck to stop after the mechanism has been released.

* * * * *